United States Patent [19]

Sommer, Jr. et al.

[11] Patent Number: 4,533,054
[45] Date of Patent: Aug. 6, 1985

[54] ROTARY FUEL HOMOGENIZER AND USE THEREOF

[75] Inventors: Edward J. Sommer, Jr., Nashville; Garry R. Kenny, College Grove; Charles E. Roos, Nashville, all of Tenn.

[73] Assignee: Magnetic Separation Systems, Inc., Nashville, Tenn.

[21] Appl. No.: 457,675

[22] Filed: Jan. 13, 1983

[51] Int. Cl.³ .............................................. B07B 13/05
[52] U.S. Cl. ..................................... 209/687; 209/690; 209/930; 241/24; 241/183; 366/58; 366/228
[58] Field of Search ............... 209/606, 689, 690, 930, 209/615, 616, 684, 699, 294, 298, 299, 687; 241/183, 182, 299, 24, 27, 79, 99, 79.1-79.3; 51/164.1; 366/57, 58, 228

[56] References Cited

U.S. PATENT DOCUMENTS

| | | | |
|---|---|---|---|
| 1,259,983 | 3/1918 | Hiller | 209/298 |
| 1,458,387 | 6/1923 | Bourne | 241/79.1 |
| 3,405,873 | 10/1968 | Gothard et al. | 241/183 |
| 3,614,003 | 10/1971 | Tremolada | 241/79.3 |
| 3,790,091 | 2/1974 | Law et al. | 241/24 |
| 4,225,094 | 9/1980 | Halldorson et al. | 241/79 |
| 4,289,279 | 9/1981 | Brandt | 241/183 |
| 4,389,020 | 6/1983 | Clin et al. | 241/24 |

FOREIGN PATENT DOCUMENTS

| | | | |
|---|---|---|---|
| 161537 | 10/1953 | Australia | 209/687 |
| 3033628 | 4/1982 | Fed. Rep. of Germany | 209/299 |

Primary Examiner—Robert B. Reeves
Assistant Examiner—Donald T. Hajec
Attorney, Agent, or Firm—Abe Hatcher

[57] ABSTRACT

Solid waste incinerator fuel is preclassified by passing it through a hollow rotating cylindrical drum which has two sets of extensions from the wall going lengthwise along the length of the drum, the first set toward one end and the second toward the other, the second set being shorter or smaller-sized than the first and the first preferably having rodlike projections which may have at least partly knifelike or bladelike ends or edges at the axial or inner ends thereof. The first set of extensions homogenizes the incoming waste by lifting, dropping, churning, and ripping it as well as fluffing it. The second set of extensions, preferably angled, lifts smaller sized heavier, non-combustible particles to the upper part of the drum from which they are removed at the exit end. The lighter material, mostly combustibles such as paper, textiles and wood, for example, is discharged toward the bottom of the exit end of the drum. When in operation the drum is preferably angled or tilted somewhat downward from entrance to exit end to facilitate movement of the material undergoing rotational treatment through the drum.

5 Claims, 4 Drawing Figures

U.S. Patent    Aug. 6, 1985    4,533,054
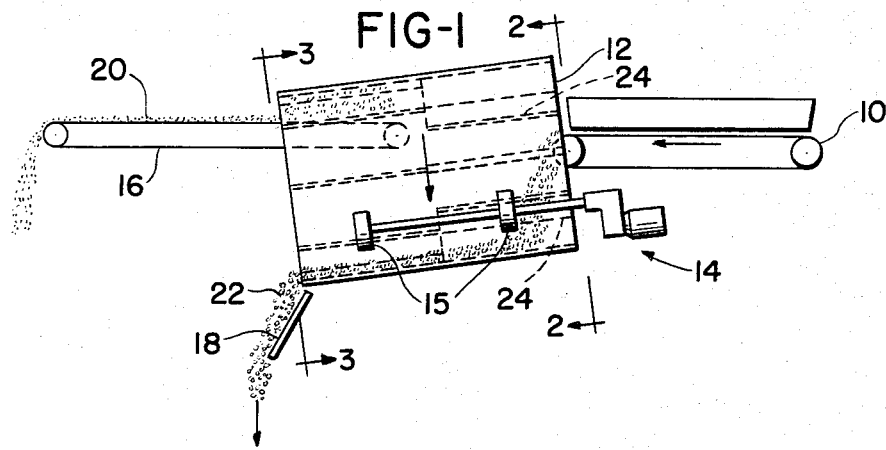
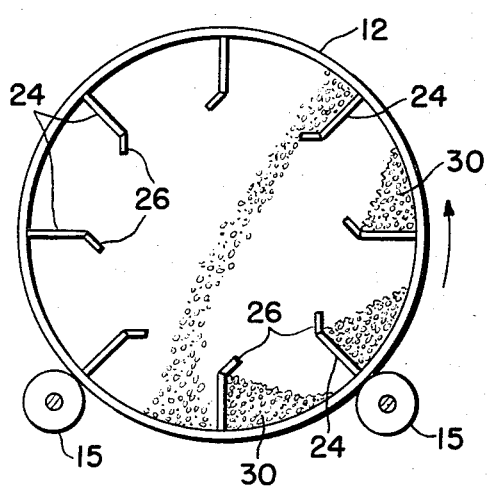
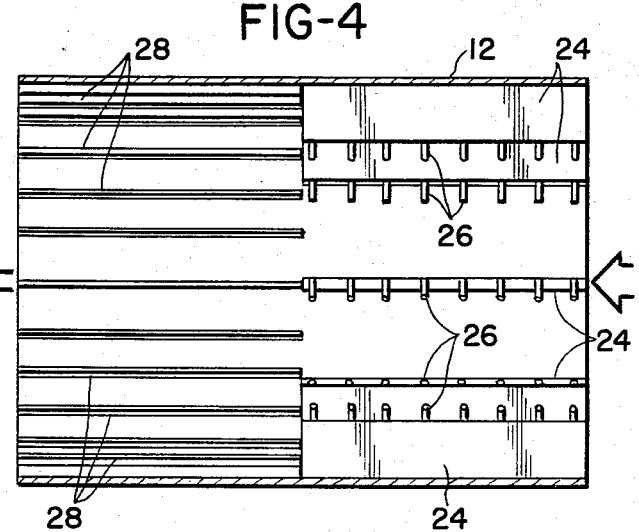
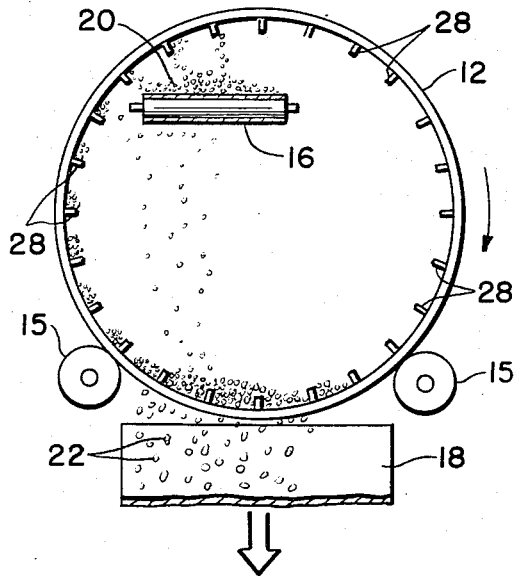

ROTARY FUEL HOMOGENIZER AND USE THEREOF

BACKGROUND OF THE INVENTION

1. Field of the Invention

This invention relates to treatment of material such as municipal waste and the like. More particularly, it relates to a rotary fuel homogenizer and its use in such treatment.

2. Description of the Prior Art

Heretofore a substantially cylindrical drum with round, oval, or square holes in the wall thereof, commonly called a trommel screen, has, for example, as a part of a process for producing refuse-derived fuel for energy recovery incineration, been used in a rotating manner to separate into fractions municipal waste or other material. For example, a minus-4 inch municipal waste underflow removed from the drum may be further treated for materials recovery and the plus-4 inch overflow shredded, magnetically scalped and incinerated or landfilled. However, the minus-4 inch fraction may contain some 50% or so by weight combustibles and typically must be further processed to remove these combustibles.

SUMMARY OF THE INVENTION

To cure this problem we have, after extended investigation, developed what we refer to as a rotary fuel homogenizer, that is, a substantially cylindrical drum, hollow or without ends, and rotatable on its axis by rotating means such as a drive shaft with drive rolls operated by a motor. At the input end of the drum is a plurality or set of what we designate as large or larger flights, that is, spaced extensions toward the central axis from the inside of the wall going lengthwise along the drum, but not necessarily parallel to the axis of the drum, and preferably substantially rectangular in lengthwise cross section or longitudinal section, although they need not be of the same width all the way along their length. These large or larger flights may be but are not necessarily equidistant apart around the planar circumference. The large flights may have rod-like extensions at an angle at their central or inner ends which may be pointed or knife blade-like to facilitate breaking open and emptying of plastic bags which may be a part of the garbage, waste, trash or other material being treated by the drum. A second plurality or set of flights, which we designate as small or smaller flights, is similarly positioned along at least a part of the remaining length of the drum toward its other or exit end. The small flight extension from the drum wall may be, but is not necessarily, perpendicular to the wall of the drum. The small flight length along the wall of the drum may be, but is not necessarily, parallel to the axis of the drum.

DESCRIPTION OF THE DRAWING AND OF THE PREFERRED EMBODIMENT OF THE INVENTION

For a better understanding of our invention reference will now be made to the drawing which forms a part hereof and which, together with the description thereof which follows, represents a preferred embodiment of the invention.

FIG. 1 is a schematic view illustrating the material treating process of the invention and showing material being treated by passage through a rotating drum with flights according to the invention.

FIG. 2 is charging end view taken at 2—2 of FIG. 1.

FIG. 3 is a discharging end view taken at 3—3 of FIG. 1.

FIG. 4 is a section taken through the length of the rotating cylindrical drum shown in FIG. 1.

In the drawing, waste is introduced from or by input or introduction means 10 such as a belt or conveyor as shown in FIG. 1 at the input end of the drum 12, which is being rotated by drum drive means 14 such as a motor or the like having drive rolls 15. Large flights 24, positioned along most or all of the first half of the length of the drum 12, having rods or rodlike extensions 26 at the inner or central ends thereof lift and drop the incoming waste 30 as shown in FIG. 2. Flights 24, preferably with angled rods 26, may have spikes or knives or blades or the like projecting from the inner or central ends thereof. The net effect of the action of the first set of flights, the large flights 24, as they rotate with the drum, is the liberation, homogenization and fluffling of the incoming waste 30. Movement of the waste along the length of the drum 12 may be assisted by giving it a slight tilt or angle downward toward its exit end, for example, of 5 to 10 degrees. At a drum diameter of 10 feet, for example, the rotation speed is preferably on the order of 10–15 revolutions per minute (rpm). Breakable containers are broken by dropping and churning by the first or large set of flights 24. The second set of flights, that is, the small flights 28, positioned along most or all of the second half of the length of the drum 12, are much less the height or projection toward the central axis of the drum 12, than the first set; for example, about 1½ inches in height as opposed to 10 inches. As shown in FIG. 3 these small flights pick up the higher density, mostly non-combustible, smaller sized matter from where it has accumulated in the bottom of the drum, due to its being of greater density, as it passes along the second section of drum 12 during rotation thereof. This heavier material 20, such as glass, stone, metal, ceramics and the like, mostly non-combustible, is then discharged at the upper part of the output end of the drum 12 by discharge means 16. The lighter, mostly combustible material 22 of larger size, such as paper, textiles, wood and the like, is moved out at the lower part of the exit end of the drum 12 via discharge means 18, which may include a conveyor belt, slide or the like. The number of large flights is preferably 6 or more. The number of small flights is preferably 15 or more. The smaller flights 28 may be positioned lengthwise at an angle to the axis such to be slightly elevated at the exit end of the drum so to retain the non-combustibles 20 in the drum 12 until they are lifted by the shorter flights 28 to be discharged toward the top by discharge means 16.

While the invention has been described in terms of preferred embodiments, the claims appended hereto are intended to encompass all embodiments which fall within the spirit of the invention.

Having thus described our invention and certain preferred embodiments thereof, we claim:

1. A municipal waste treating apparatus comprising a single cylinder having an inner annular wall, adapted to be rotated around the axis of said single cylinder, said single cylinder being of substantially the same diameter along its entire length and open at least in part at both ends thereof; said cylinder having spaced around the inside of said annular wall thereof a first set of substantially straight extensions extending from an inner surface of said wall toward said axis of said cylinder and running parallel to said axis only a first half of the length of said cylinder, said substantially straight extensions having rodlike extensions at an angle at their inner ends, said rodlike extensions being knife blade-like to facilitate breaking open and emptying plastic bags, said cylinder having a second set of similarly positioned but much shorter extensions extending from said inner surface to said annular wall and running along only a second half of the length of said cylinder, said cylinder having discharge means and being substantially hollow and substantially unimpeded along said length thereof except for said extensions and except for said discharge means, and said annular wall being substantially continuous except for said extensions and without perforations.

2. The material treating appartus of claim 1 including in association with said cylinder means for introducing material into one end of said cylinder, means for removing at least two separate fractions of material from the an opposite end of said cylinder and means for rotating said cylinder on its axis.

3. Material The municipal waste treating apparatus of claim 1 having means for removing two separate fractions of material from one end of said cylinder and means for rotating said cylinder.

4. A process for separating municipal waste containing combustibles and non-combustibles of various sizes and weights into two fractions, said process comprising introducing said municipal waste into a rotating cylinder at one end thereof, picking up, dropping, fluffing, homogenizing and churning said waste, breaking breakable containers and breaking open and emptying plastic bags as said waste is passed along a first section of said cylinder by a first set of extensions extending from the inside wall of said cylinder, said extensions being provided with rods having blades at their ends, accumulating a first heavier and mostly non-combustible fraction of said waste in a lower part of said cylinder as it rotates and picking up said fraction as it is passed along a second section of said cylinder by a second set of much shorter extensions extending from the inside wall of said cylinder, removing said heavier, mostly non-combustible fraction containing glass, stone, metal and ceramics at an upper part of an end opposite said one end of said cylinder and withdrawing a lighter, mostly combustible fraction containing paper, textiles, plastics and wood at a lower part of said end opposite said one end.

5. The process of claim 4 wherein said material is passed at a slightly downward angle as it moves through said cylinder by tilting same.

* * * * *